United States Patent
Gao et al.

(10) Patent No.: US 11,017,039 B2
(45) Date of Patent: May 25, 2021

(54) MULTI-STAGE RANKING OPTIMIZATION FOR SELECTING CONTENT

(71) Applicant: Facebook, Inc., Menlo Park, CA (US)

(72) Inventors: Tianshi Gao, Fremont, CA (US);
Pengjun Pei, Santa Clara, CA (US);
Bingqing Wang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 727 days.

(21) Appl. No.: 15/829,843

(22) Filed: Dec. 1, 2017

(65) Prior Publication Data
US 2019/0171766 A1 Jun. 6, 2019

(51) Int. Cl.
*G06F 16/95* (2019.01)
*G06F 16/9535* (2019.01)
*G06N 3/08* (2006.01)
*G06Q 50/00* (2012.01)
*G06F 16/2453* (2019.01)

(52) U.S. Cl.
CPC .... *G06F 16/9535* (2019.01); *G06F 16/24542* (2019.01); *G06N 3/08* (2013.01); *G06Q 50/01* (2013.01)

(58) Field of Classification Search
CPC . G06F 16/9535; G06F 16/24542; G06N 3/08; G06N 20/00; G06Q 50/01; G06Q 30/02
See application file for complete search history.

(56) References Cited

U.S. PATENT DOCUMENTS

| | | | |
|---|---|---|---|
| 8,832,560 B2* | 9/2014 | Yung | G06F 16/1748 715/738 |
| 9,911,130 B1* | 3/2018 | Battisti | G06Q 30/0631 |
| 2011/0137893 A1* | 6/2011 | Shnitko | G06F 16/334 707/723 |
| 2011/0176724 A1* | 7/2011 | Yang | G06K 9/6252 382/159 |
| 2013/0151443 A1* | 6/2013 | Kyaw | G06N 5/022 706/12 |
| 2014/0089777 A1* | 3/2014 | Roiniotis | G06F 3/048 715/234 |
| 2014/0250114 A1* | 9/2014 | Piantino | G06F 3/04847 707/725 |
| 2014/0278308 A1* | 9/2014 | Liu | H04L 67/22 703/6 |

(Continued)

*Primary Examiner* — Alicia M Willoughby
(74) *Attorney, Agent, or Firm* — Fenwick & West LLP

(57) ABSTRACT

To present one or more content to users of an online system, the online system identifies a content evaluation pipeline including an order of a plurality of stages having one or more computer models for evaluating a likelihood of user interaction with a content item. The content evaluation pipeline selects a decreasing number of content items, from each stage of the order, according to the order of the stages in the order. The online system identifies a set of candidate modifications to one or more operational parameters of the content evaluation pipeline. For each candidate modification, the online system determines a compute time value and a content selection value. For a given amount of compute time, the online system optimizes the one or more operational parameters based on the determined content time value and the determined content selection value to increase the content selection value of the content evaluation pipeline.

20 Claims, 5 Drawing Sheets

(56) References Cited

U.S. PATENT DOCUMENTS

| | | | |
|---|---|---|---|
| 2014/0280214 A1* | 9/2014 | Han | G06F 16/9535 |
| | | | 707/748 |
| 2015/0127590 A1* | 5/2015 | Gay | G06Q 30/0242 |
| | | | 706/12 |
| 2016/0203519 A1* | 7/2016 | Ketchpaw | G06Q 30/0267 |
| | | | 705/14.64 |
| 2017/0155694 A1* | 6/2017 | Pinkovezky | G06F 40/166 |
| 2017/0206457 A1* | 7/2017 | Roychowdhury | G06N 20/00 |
| 2018/0123918 A1* | 5/2018 | Steinhauser | H04L 43/0858 |
| 2018/0165368 A1* | 6/2018 | Sasidharan | G06F 16/9535 |
| 2018/0173376 A1* | 6/2018 | Cohen | H04L 67/20 |
| 2018/0197097 A1* | 7/2018 | Chatterjee | G06N 5/003 |
| 2019/0102693 A1* | 4/2019 | Yates | G06N 20/20 |
| 2020/0167691 A1* | 5/2020 | Golovin | G06N 7/005 |
| 2020/0202170 A1* | 6/2020 | Basu | G06F 3/04842 |

* cited by examiner

400

```
Identify Content Evaluation Pipelines Comprising Order
Of Plurality Of Stages
410
```

```
Identifying Set Of Candidate Modifications To Modify
One Or More Operational Parameters Of Content
Evaluation Pipeline
420
```

```
For Each Modification Of Set, Determine Compute Time
And Content Selection Value
430
```

```
For Given Amount Of Compute Time, Optimizing One Or
More Operational Parameters Based On Determined
Content Selection Value And Determined Compute Time
To Increase Content Selection Value
440
```

FIG. 4

MULTI-STAGE RANKING OPTIMIZATION FOR SELECTING CONTENT

BACKGROUND

This disclosure relates generally to presenting content to users of an online system, and more specifically to generating a feed of content for presentation to a user of the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Many online systems receive compensation from a publishing user for presenting online system users with certain types of content provided by the publishing user. Frequently, online systems charge a publishing user for each presentation of content to an online system user or for each interaction with content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

However, selecting relevant content for a particular user from among a very large (e.g., 10,000) number of content items may be challenging to effectively perform accurately. The accuracy of this computation may depend on the interaction or behavior associated with the content, and more complex models may more effectively predict more difficult interactions. Since the accuracy of these models may differ, effectively optimizing the models for selecting content from among the large number of items given these constraints in time or computational resources is challenging.

SUMMARY

To present one or more content to users of an online system, the online system identifies a content evaluation pipeline configured to select one or more content items that the users are more likely to interact with. The online system includes an order of a plurality of stages having one or more computer models for evaluating a likelihood of user interaction with a content item. The content evaluation pipeline selects a decreasing number of content items in each stage of the pipeline. For example, the content evaluation pipeline has three stages. The first stage of the content evaluation pipeline receives 1000 content items, and the content evaluation pipeline ranks the 1000 content items based on the evaluated likelihood of user interaction with each of the 1000 content items, and selects top 500 content items as an input for the second stage. The second stage outputs 100 content items, and the third stage receives the 100 content items as an input and outputs 3 content items for presenting to the user.

To optimize the content evaluation pipeline, the online system identifies a set of candidate modifications to one or more operational parameters of the content evaluation pipeline. Examples of operational parameters include the number of stages of a content evaluation pipeline, the number of computer models included in a stage, the number of layers of a computer model, the number of features of a computer model, the number of nodes of a computer model, and a type of a computer model. For example, a candidate modification increases or reduces the number of the computer models included in a stage. For each candidate modification, the online system determines a compute time value and a content selection value. The compute time value represents how long the content evaluation pipeline takes to generate an output. The content selection value represents how much compensation that the online system receives for presenting one or more content items selected by a content evaluation pipeline if the one or more content items are presented to a user, if the one or more content items receive a user interaction when presented, or if any suitable condition is satisfied when the one or more content items are presented to a user. For a given amount of compute time, the online system optimizes the one or more operational parameters based on the determined content time value and the determined content selection value to increase the content selection value of the content evaluation pipeline. For example, for a given amount of compute time, the online system selects one or more pipeline modifications to reduce complexities of one or more computer models that evaluate less-valuable objectives (e.g., click-through rate prediction is less valuable than post-click conversion prediction), while the online system selects one or more pipeline modifications to increase complexities of one or more computer models that evaluate more-valuable objectives (e.g., post-click conversion prediction).

In various embodiments, the online system optimizes one or more content evaluation pipelines based on various selection characteristics, such as a type of content, user characteristic, and interaction associated with the content. For example, different selection characteristics tend to provide different content selection values. The online system increases a complexity of a content evaluation pipeline for some selection characteristics that are likely to provide high content selection values, and reduces the complexity of the content evaluation pipeline for other selection characteristics that are likely to provide low content selection values.

BRIEF DESCRIPTION OF THE DRAWINGS

FIG. 4 is a flowchart illustrating a process for optimizing a content evaluation pipeline, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Examples of Content Evaluation Pipeline

An online system uses a content evaluation pipeline to select one or more content items that a user of an online system is more likely to interact with. The content evaluation pipeline includes an order of a plurality of stages having one or more computer models for evaluating a likelihood of user interaction with a content item. The content evaluation pipeline selects a decreasing number of content items, from each stage of the order, according to the order of the stages in the order.

Figure 1A:
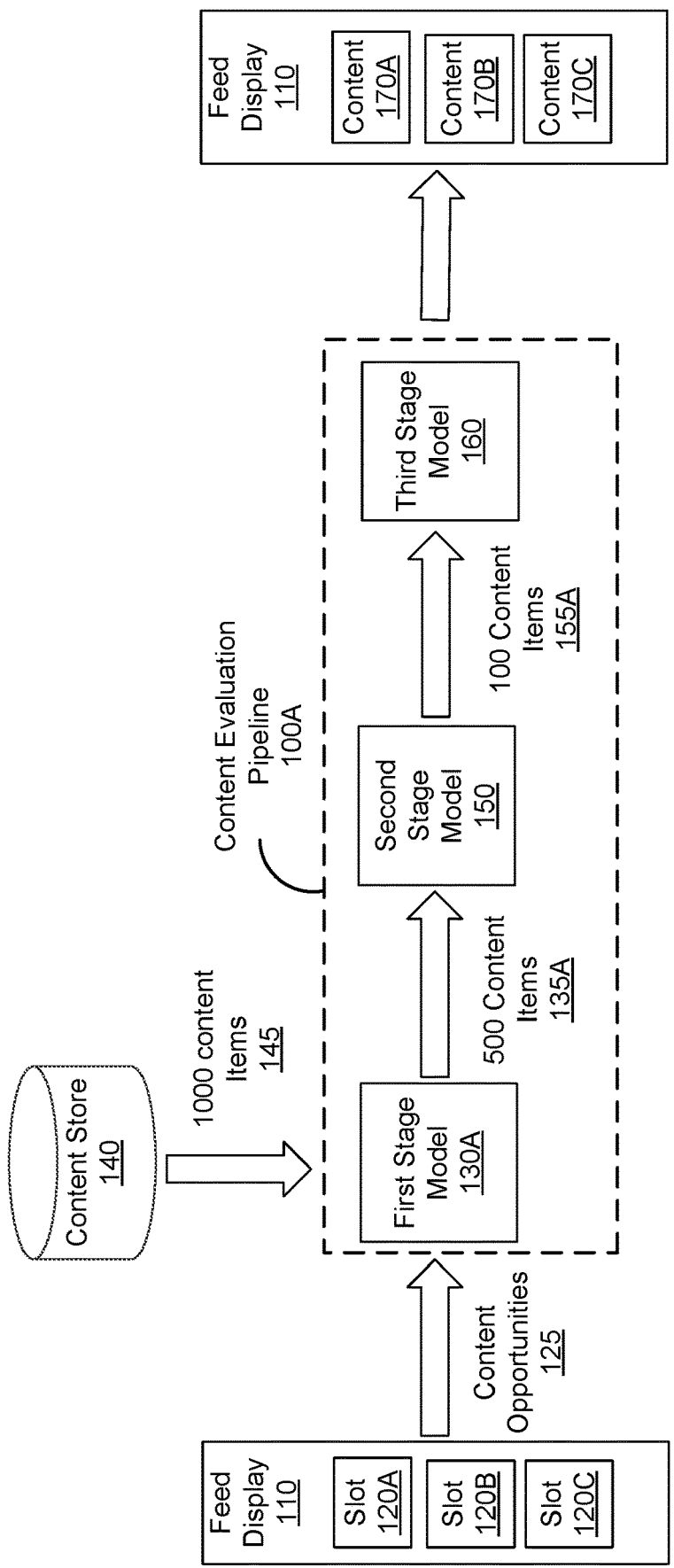
FIG. 1A is a block diagram of an environment where a content evaluation pipeline operates, in accordance with an embodiment.

FIG. 1A is a block diagram of an environment where a content evaluation pipeline 100A operates, in accordance with an embodiment. In the embodiment of FIG. 1A, a feed display 110 has three available slots (e.g. 120A, 120B, and 120C) to generate content opportunities 125. In this example, the content store 140 provides 1000 content items 145 (e.g., social networking content items and advertisements) to the content evaluation pipeline 100A. The content evaluation pipeline 100A ultimately selects three content items 170A, 170B and 170C for the three available slots in the feed display 110. The content evaluation pipeline 100A includes three stages, each having a computer model (e.g., a first stage model 130A, a second stage model 150, and a third stage model 160) for evaluating a likelihood of a user interaction with a content item. The content evaluation pipeline 100A selects a decreasing number of content items, from each stage of the order, according to the order of the stages in the order. In this example, the first stage model 130A receives the 1000 content items 145 from the content store 140 and ranks the 1000 content items based on the evaluated likelihood of user interaction with each of the 1000 content items, and selects top 500 content items 135A as an input for the second stage. The top one content item of the top 500 content items 135A is a content item that the user is most likely to interact with. The second stage model 150 uses the 500 content items 135A as an input and selects 100 content items 155A as an input for the third stage model 160. The third stage model 160 selects top three content items 170A, 170B and 170C for presenting in the feed display 110.

Figure 1B:
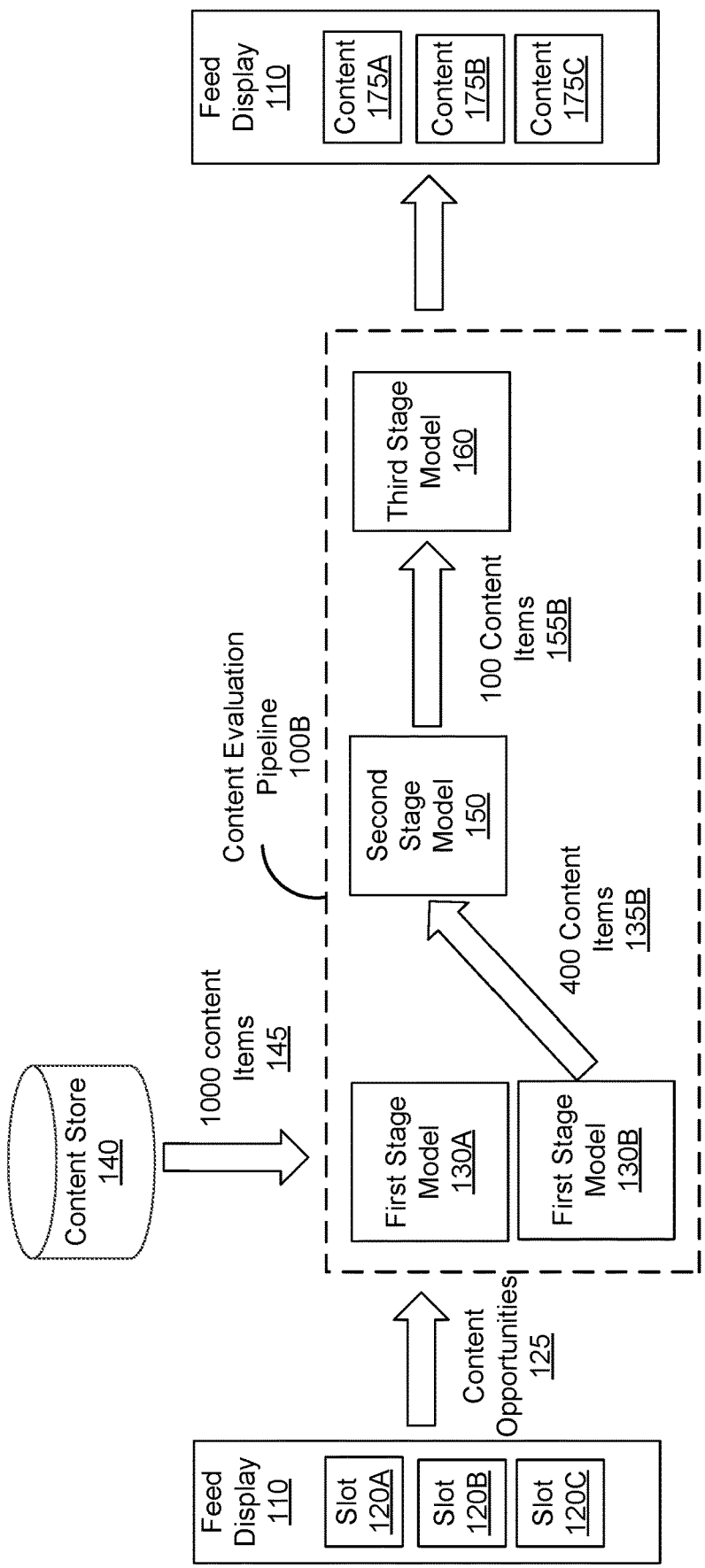
FIG. 1B is a block diagram of an environment where a content evaluation pipeline operates, in accordance with another embodiment.

FIG. 1B is a block diagram of an environment where a content evaluation pipeline 100B operates, in accordance with another embodiment. In this example, compared with the content evaluation pipeline 100A, the content evaluation pipeline 100B includes an additional first stage model 130B. In this example, the different first stage models (e.g., 130A and 130B) may represent different models to be used based on various selection characteristics, such as a type of content, user characteristic, and interaction associated with the content. For these different characteristics, different models may be applied in the first stage to evaluate the content items for the second stage. In this example, different user characteristics may determine which model is used in the first stage. Thus, when the user characteristic matches first stage model 130B, it is used rather than first stage model 130A. The first stage model 130B receives the 1000 content items 145 and selects 400 content items 135B. The content evaluation pipeline 100B selects the 400 content items as an input for the second stage model 150 using the first stage model 130B. The second stage model 150 selects 100 content items 155B as an input for the third stage model 160 that selects three content items 175A, 175B, and 175C for presenting in the feed display 110. These different first stage models may represent different computing complexities and associated accuracy of the models. As a result, the effective pipeline used for evaluating a particular content item or for a particular user may differ. These different pipelines may provide different accuracy and require different computational requirements. Though shown here as a separate model for the user in a given stage, many different modifications to the pipeline may be implemented as discussed below to adjust the effective pipeline (and thereby computational requirements) for different selection characteristics.

System Architecture

Figure 2:
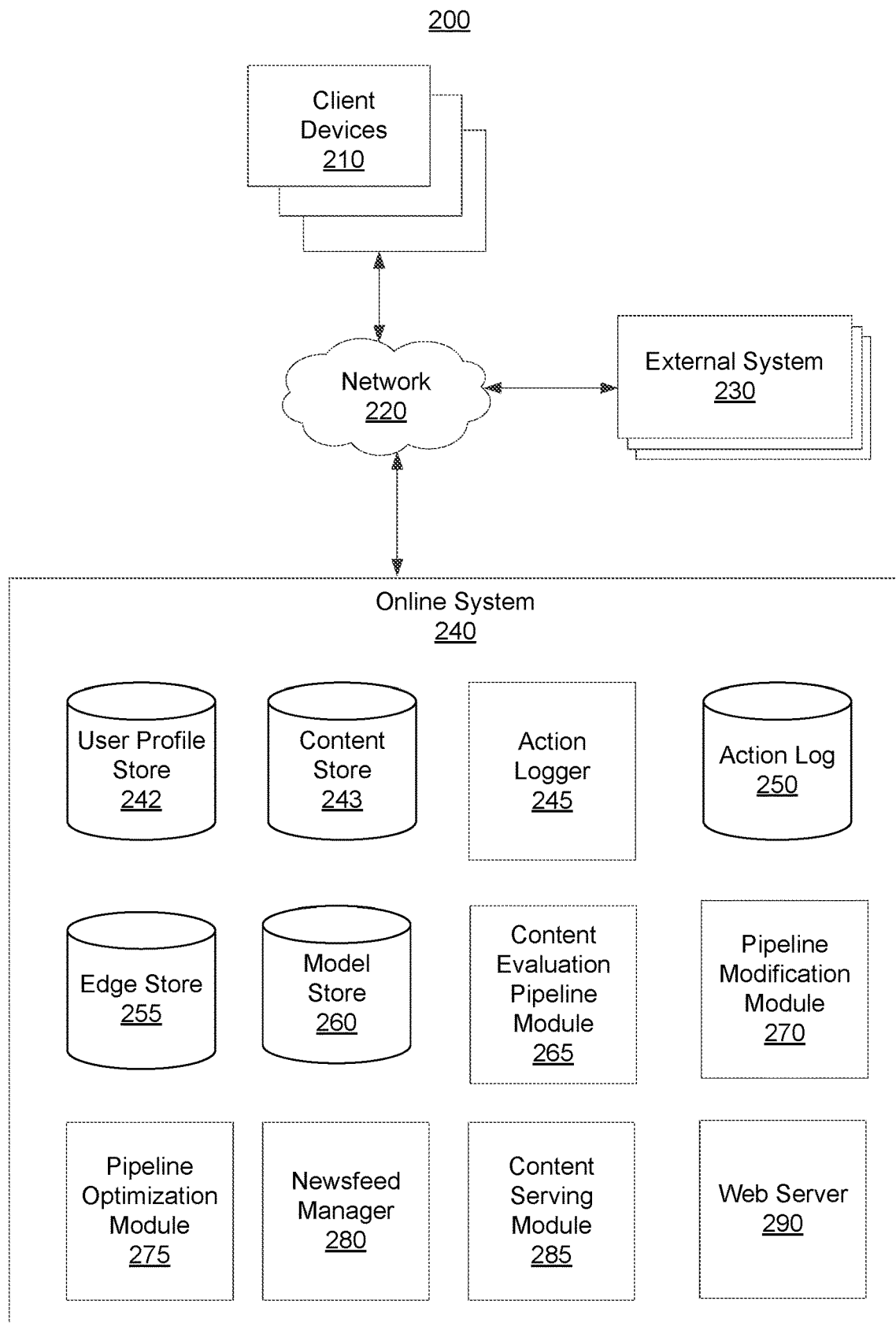
FIG. 2 is a block diagram of a system environment where an online system operates, in accordance with an embodiment.

FIG. 2 is a block diagram of a system environment 200 where an online system 240 operates, in accordance with an embodiment. The system environment 200 shown by FIG. 2 comprises one or more client devices 210, a network 220, one or more external systems 230, and the online system 240. In alternative configurations, different and/or additional components may be included in the system environment 200. For example, the online system 240 is a social networking system, a content sharing network, or another system providing content to users. The embodiments described herein can be adapted to online systems that are not social networking systems.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, a smartwatch, or another suitable device. A client device 210 is configured to communicate via the network 220. In one embodiment, a client device 210 executes an application allowing a user of the client device 210 to interact with the online system 240. For example, a client device 210 executes a browser application to enable interaction between the client device 210 and the online system 240 via the network 220. In another embodiment, a client device 210 interacts with the online system 240 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more external systems 230 may be coupled to the network 220 for communicating with the online system 240, which is further described below in conjunction with FIG. 2. In one embodiment, an external system 230 is an application provider communicating information describing applications for execution by a client device 210 or communicating data to client devices 210 for use by an application executing on the client device. In other embodiments, an external system 230 provides content or other information for presentation via a client device 210. An external system 230 may also communicate information to the online system 240, such as advertisements, content, or information about an application provided by the external system 230.

Various external systems 230 provide content to users of the online system 240. For example, an external system 230 maintains pages of content that users of the online system 240 may access through one or more applications executing on a client device 210. The external system 230 may provide content items to the online system 240 identifying content provided by the online system 240 to notify users of the online system 240 of the content provided by the external system 230. For example, a content item provided by the external system 230 to the online system 240 identifies a page of content provided by the online system 240 that specifies a network address for obtaining the page of content. If the online system 240 presents the content item to a user who subsequently accesses the content item via a client device 210, the client device 210 obtains the page of content from the network address specified in the content item.

The online system 240 optimizes one or more content evaluation pipelines to select one or more content items that are likely to have high content selection values for a given user of the online system 240. A content selection value represents how much compensation that the online system receives for presenting one or more content items selected by a content evaluation pipeline if the one or more content items are presented to a user, if the one or more content items receive a user interaction when presented, or if any suitable condition is satisfied when the one or more content items are presented to a user. For example, the content selection value is determined by a bid amount that specifies an amount of compensation the online system 240 receives from a publishing user associated with a content item, if the content item is displayed. Alternatively, the content selection value is determined by multiplying the bid amount by a prediction likelihood indicating that how likely a user will interact with a content item. Examples of content items include social networking content items (e.g., stories, photos, videos, and invitations), campaigns, and advertisements. A content selection pipeline uses stages to filter a very large number of content items to those that are likely to be a high content selection value for a given user. At each stage, the content evaluation pipeline evaluates, ranks, and then filers the very larger number of content items to proceed to the next stage to narrow candidate content items to a small number of content items that high content selection values.

If the online system 240 has a limited amount of compute power to effectively select content items, the fewer content items that move to the next stage, the less compute time value is required at the next stage. A compute time value represents how long the content evaluation pipeline takes to generate an output. While accounting for a complexity of the content evaluation pipeline (e.g., the more complex the content evaluation pipeline is, the higher accurate the content item selection is, and the more compute time is required), this creates a tradeoff between a complexity of the content evaluation pipeline and a compute time value. The online system optimizes the content evaluation pipelines to increase content selection values as further described below.

Example of Online System

In the embodiment of FIG. 2, the online system 240 shown in FIG. 2 includes a user profile store 242, a content store 243, an action logger 245, an action log 250, an edge store 225, a model store 260, a content evaluation pipeline module 265, a pipeline modification module 270, a pipeline optimization module 275, a newsfeed manager 280, a content serving module 285, and a web server 290. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 242. A user profile includes declarative information about the user that was explicitly shared by the user and may also include profile information inferred by the online system 240. In one embodiment, a user profile includes multiple data fields, each describing one or more attributes of the corresponding user of the online system 240. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 240 displayed in an image. A user profile in the user profile store 242 may also maintain references to actions by the corresponding user performed on content items in the content store 243 and stored in the action log 250.

While user profiles in the user profile store 242 are frequently associated with individuals, allowing individuals to interact with each other via the online system 240, user profiles may also be stored for entities such as businesses or organizations. This allows an entity to establish a presence on the online system 240 for connecting and exchanging content with other online system users. The entity may post information about itself, about its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity.

The content store 243 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 243, such as status updates, photos tagged by users to be associated with other objects in the online system 240, events, groups or applications. In some embodiments, objects are received from external applications or external applications separate from the online system 240. In one embodiment, objects in the content store 243 represent single pieces of content, or content "items." Hence, online system users are encouraged to communicate with each other by posting text and content items of various types of media to the online system 240 through various communication channels. This increases the amount of interaction of users with each other and increases the frequency with which users interact within the online system 240.

One or more content items included in the content store 243 include a creative, which is content for presentation to a user, and a bid amount. As used herein, a content item including a bid amount is referred to as a "sponsored content item," while a content item (e.g., a social networking content item) that does not include a bid amount is referred to as an "organic content item." The creative is text, image, audio, video, or any other suitable data presented to a user. In various embodiments, the creative also specifies a page of content.

Various sponsored content items may include an objective identifying an interaction that a user associated with a sponsored content item desires other users to perform when presented with content included in the sponsored content item. Example objectives include: installing an application associated with a sponsored content item, indicating a preference for a sponsored content item, sharing a sponsored content item with other users, interacting with an object associated with a sponsored content item, or performing any other suitable interaction. As content from a sponsored content item is presented to online system users, the online system 240 logs interactions between users presented with the sponsored content item or with objects associated with the sponsored content item. Additionally, the online system 240 receives compensation from a publishing user associated with a sponsored content item as online system users perform interactions with the sponsored content item that satisfy the objective included in the sponsored content item.

Additionally, a sponsored content item may include one or more targeting criteria specified by the publishing user who provided the sponsored content item to the online system 240. Targeting criteria included in a sponsored content item request specify one or more characteristics of users eligible to be presented with the sponsored content item. For example, targeting criteria are used to identify users having user profile information, edges, or actions satisfying at least one of the targeting criteria. Hence, targeting criteria allow a publishing user to identify users having specific characteristics as eligible to be presented with content from a sponsored content item, simplifying subsequent distribution of content to different users.

In one embodiment, targeting criteria may specify actions or types of connections between a user and another user or object of the online system 240. Targeting criteria may also specify interactions between a user and objects performed external to the online system 240, such as on an external system 230. For example, targeting criteria identifies users who have taken a particular action, such as sent a message to another user, used an application, joined a group, left a group, joined an event, generated an event description, purchased or reviewed a product or service using an online marketplace, requested information from an external system 230, installed an application, or performed any other suitable action. Including actions in targeting criteria allows publishing users to further refine users eligible to be presented with sponsored content items. As another example, targeting criteria identifies users having a connection to another user or object or having a particular type of connection to another user or object.

The action logger 245 receives communications about user actions internal to and/or external to the online system 240, populating the action log 250 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 250.

The action log 250 may be used by the online system 240 to track user actions on the online system 240, as well as actions on external systems 230 that communicate information to the online system 240. Users may interact with various objects on the online system 240, and information describing these interactions is stored in the action log 250. Examples of interactions with objects include: commenting on posts, sharing links, checking-in to physical locations via a client device 210, accessing content items, and any other suitable interactions. Additional examples of interactions with objects on the online system 240 that are included in the action log 250 include: commenting on a photo album, communicating with a user, establishing a connection with an object, joining an event, joining a group, creating an event, authorizing an application, using an application, expressing a preference for an object ("liking" the object), expressing a reaction to an object, and engaging in a transaction. Additionally, the action log 250 may record a user's interactions with advertisements on the online system 240 as well as with other applications operating on the online system 240. In some embodiments, data from the action log 250 is used to infer interests or preferences of a user, augmenting the interests included in the user's user profile and allowing a more complete understanding of user preferences.

The action log 250 may also store user actions taken on an external system 230, such as an external website, and communicated to the online system 240. For example, an e-commerce website may recognize a user of an online system 240 through a social plug-in enabling the e-commerce website to identify the user of the online system 240. Because users of the online system 240 are uniquely identifiable, e-commerce websites, such as in the preceding example, may communicate information about a user's actions outside of the online system 240 to the online system 240 for association with the user. Hence, the action log 250 may record information about actions users perform on an external system 230, including webpage viewing histories, advertisements or other content with which the user engaged, purchases made, and other patterns from shopping and buying. Hence, the action log 250 may include information identifying content provided by one or more external systems 230 that a user of the online system 240 has accessed or content provided by one or more external systems 230 with which the user of the online system 240 otherwise interacted. Various external systems 230 may include tracking mechanisms in content comprising instructions that, when executed by a client device 210, provide information identifying the content and identifying a user of the online system 240 associated with the client device 210 to the online system 240. In various embodiments, the information provided by the tracking mechanism identifies one or more products associated with an external system 230 and include in, or otherwise associated with, the identified content. The information identifying the content is stored in the action log 250 in association with information identifying the user to the online system 240. Additionally, actions a user performs via an application associated with an external system 230 and executing on a client device 210 may be communicated to the action logger 245 by the application for recordation and association with the user in the action log 250.

In one embodiment, the edge store 255 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240. Users and objects within the online system 240 can represented as nodes in a social graph that are connected by edges stored in the edge store 255.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 240, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 255 also stores information about edges, such as affinity scores for objects, interests, and other users. Affinity scores, or "affinities," may be computed by the online system 240 over time to approximate a user's affinity for an object, interest, and other users in the online system 240 based on the actions performed by the user. A user's affinity may be computed by the online system 240 over time to approximate a user's affinity for an object, interest, and other users in the online system 240 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 255, in one embodiment. Alternatively, each interaction between a user and a specific object is stored as a separate edge. In some embodiments, connections between users may be stored in the user profile store 242, or the user profile store 242 may access the edge store 255 to determine connections between users.

The model store 260 stores various computer models to evaluate a likelihood of user interaction with a content item. Examples of a computer model include a machine learning model (e.g., a supervised machine learning model, or an unsupervised machine learning model), a deep learning model (e.g., a neural network model). The model store 260 also stores training datasets for training the various computer models.

The content evaluation pipeline module 265 generates one or more content evaluation pipelines. The content evaluation pipeline module 265 generates rules to generate a content evaluation pipeline that includes an order of a plurality of stages each having one or more computer models and selects a decreasing number of content items, from each stage of the order, according to the order of the stages in the order. The rules may include the number of stages, the order of stages, the number of computer models for a stage, the number of content items selected from a stage, a rule to select one or more computer models from the model store 260 for a stage, or a rule to select one or more computer models in a stage for delivering content items to the next stage (e.g., a rule to select a more complex model in a stage for delivering content items to the next stage).

The pipeline modification module 270 modifies one or more operational parameters to a content evaluation pipeline, and calculates a content evaluation value and a compute time value for each modification. An operational parameter is a parameter that affects rules to generate a content evaluation pipeline. Examples of operational parameters include the number of stages of a content evaluation pipeline, the number of computer models included in a stage, the number of layers of a computer model, the number of features of a computer model, the number of nodes of a computer model, and a type of a computer model. The compute time value is a sum of compute time values of all the computer models. The content evaluation value is a maximum or an average value of an output of the content evaluation pipeline. In various embodiments, the pipeline modification module 270 determines a marginal content selection value relative to marginal compute time. For example, the pipeline modification module 270 determines a difference of content selection values between an initial content evaluation pipeline and the content evaluation pipeline modified by a candidate modification, as the marginal content selection value. The pipeline modification module 270 determines a difference of compute time values between the initial content evaluation pipeline and the content evaluation pipeline modified by the candidate modification, as the marginal compute time value. The pipeline modification module 270 divides the marginal content selection value by the marginal compute time value. The larger marginal content selection value relative to marginal compute time is, the faster the complexity of the content evaluation pipeline changes. These quantitative data (e.g., compute time values, content selection values, marginal compute time values, marginal content selection values, or marginal compute time values relative to marginal compute time) allows the pipeline optimization module 275 to optimize the content evaluation pipeline to increase the content selection value for a given amount of compute time, and/or for different types of users, content and interactions, as further described below. Examples of pipeline modification are further described in FIG. 3.

The pipeline optimization module 275 optimizes one or more content evaluation pipelines to select one or more content items that are likely to have high content selection values for a given user of the online system 240. For a given amount of compute time, the pipeline optimization module 275 selects one or more pipeline modifications to reduce complexities of one or more computer models that evaluate less-valuable objectives (e.g., click-through rate prediction is less valuable than post-click conversion prediction), while the pipeline optimization module 275 selects one or more pipeline modifications to increase complexities of one or more computer models that evaluate more-valuable objectives (e.g., post-click conversion prediction). For example, increasing the number of layers in a computer model in the final stage to evaluate more-valuable objectives results in a higher accurate prediction result but a more compute time value. Changing the type of a computer model in the first stage from a complex model to a simple model to evaluate less-valuable objectives results in a lower accurate prediction result but a fewer computer time value. For a given amount of computer time, the pipeline optimization module 275 changes the computer model in the first stage from a complex model to a simple model, while the pipeline optimization module 275 increases the number of layers in the computer model in the final stage to generate a high accurate prediction result within the given amount of compute time.

In various embodiments, the pipeline optimization module 275 optimizes one or more content evaluation pipelines based on various types of users, content, and interactions (e.g., user interactions with a content item). For example, different selection characteristics tend to provide different content selection values (e.g., users who are students are more valuable than users who are not students for textbook advertisement, content with images is more valuable than content without images, purchasing a content item is more valuable than viewing the content item). The pipeline optimization module 275 increases a complexity of a content evaluation pipeline for some selection characteristics that are likely to provide high content selection values, and reduces the complexity of the content evaluation pipeline for other selection characteristics that are likely to provide low content selection values. To optimize the amount of computation accuracy for the effective pipeline for these types likely to provide high content selection value relative to others, the marginal content selection value for the compute time may be adjusted to be similar across the different pipelines, so that the complexity matches the additional value of the complexity.

The newsfeed manager 280 may generate content for presentation to a user based on information in the action log 250 and in the edge store 255 or may select candidate stories included in content store 243. One or more of the candidate stories are selected and presented to a user by the newsfeed manager 280.

For example, the newsfeed manager 280 receives a request to present one or more stories to an online system user. The newsfeed manager 280 accesses one or more of the user profile store 242, the content store 243, the action log 250, and the edge store 255 to retrieve information about the identified user. For example, stories or other data associated with users connected to the identified user are retrieved. The retrieved stories or other data is analyzed by the newsfeed manager 280 to identify content likely to be relevant to the identified user. For example, stories associated with users not connected to the identified user or stories associated with users for which the identified user has less than a threshold affinity are discarded as candidate stories. Based on various criteria, the newsfeed manager 280 selects one or more of the candidate stories for presentation to the identified user.

In various embodiments, the newsfeed manager 280 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 242. The newsfeed manager 280 may also determine the order in which selected stories are presented via the newsfeed. For example, the newsfeed manager 280 determines that a user has a highest affinity for a specific user and increases the number of stories in the newsfeed associated with the specific user or modifies the positions in the newsfeed where stories associated with the specific user are presented.

The newsfeed manager 280 may also account for actions by a user indicating a preference for types of stories and selects stories having the same, or similar, types for inclusion in the newsfeed. Additionally, newsfeed manager 280 may analyze stories received by an online system 240 from various users and obtains information about user preferences or actions from the analyzed stories. This information may be used to refine subsequent selection of stories for newsfeeds presented to various users.

The content serving module 285 receives content items from the various external systems 230 for provision to users to whom the content would be relevant and delivers appropriate content items to users, and stores the received content items in the content store 243. The content serving module 285 sends the received content items the content evaluation pipeline module 265 to select one or more content items to be delivered to the client device 210 for presentation to the user. For example, when an opportunity arises to present a content item to the user, the content evaluation pipeline module 265 selects a content item that a user is most likely to perform actions on (e.g., clicking on the content item, visiting a website via clicking on the content item, placing the content item in a virtual shopping cart, or purchasing the content item). The content serving module 285 delivers the selected content item to the user for the opportunity.

The web server 290 links the online system 240 via the network 220 to the one or more client devices 210, as well as to the one or more external systems 230. The web server 290 serves web pages, as well as other web-related content, such as JAVA®, FLASH®, XML and so forth. The web server 290 may receive and route messages between the online system 240 and the client device 210, for example, instant messages, queued messages (e.g., email), text messages, short message service (SMS) messages, or messages sent using any other suitable messaging technique. A user may send a request to the web server 290 to upload information (e.g., images or videos) that are stored in the content store 243. Additionally, the web server 290 may provide application programming interface (API) functionality to send data directly to native client device operating systems, such as IOS®, ANDROID™, WEBOS® or RIM®.

Content Evaluation Pipeline Optimization

Figure 3:
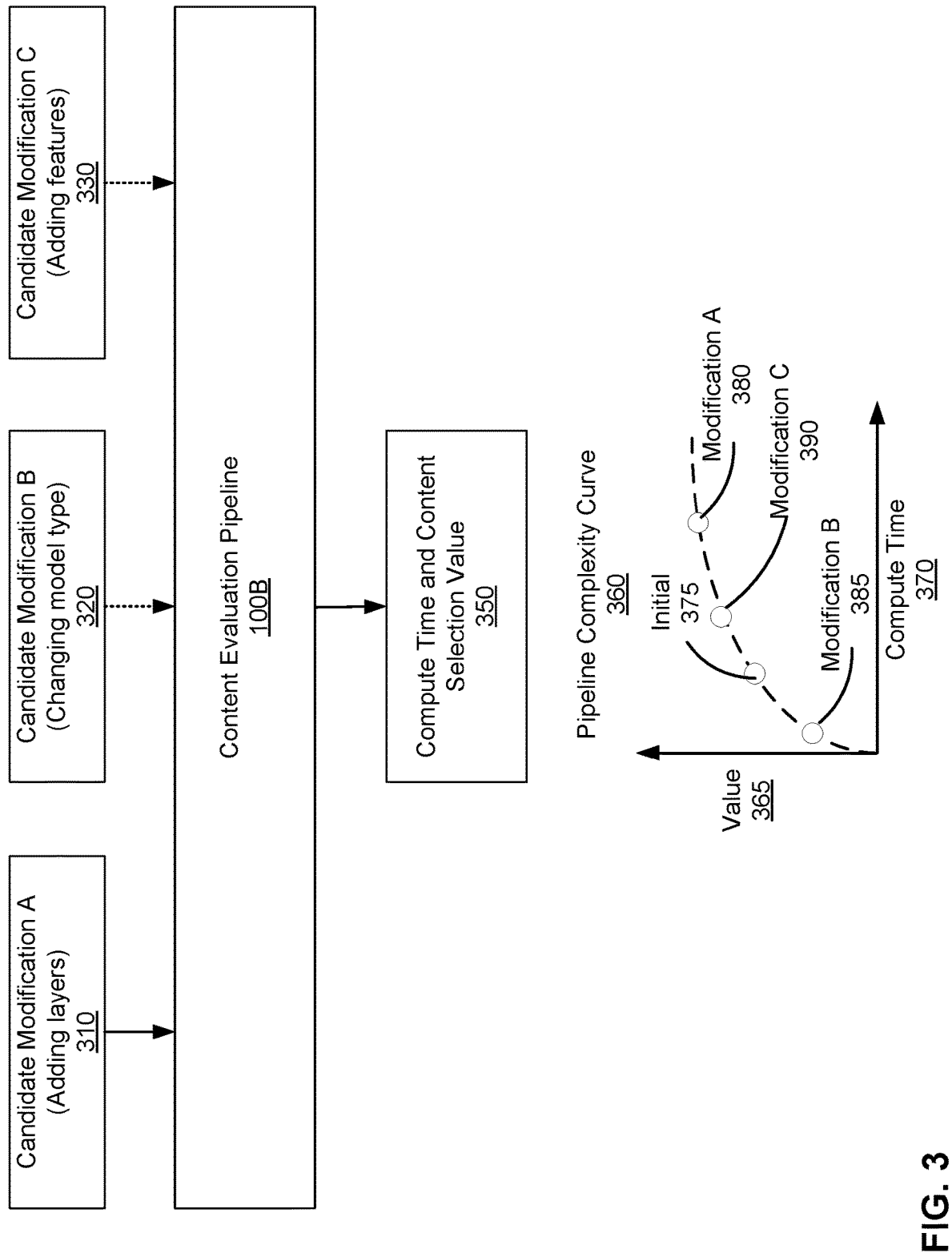
FIG. 3 is an example of applying candidate modifications to a content evaluation pipeline to generate a pipeline complexity curve, in accordance with an embodiment.

FIG. 3 is an example of applying candidate modifications (e.g., 310, 320 and 330) to the content evaluation pipeline 100B to generate a pipeline complexity curve 360, in accordance with an embodiment. In the embodiment of FIG. 3, the candidate modification A 310 adds more layers to the third stage model 160 (e.g., a neural network model). The candidate modification B 320 changes the first stage model 130B to a simple model (e.g., changing a post-click conversion prediction model to a click-through rate prediction model). The candidate modification C 330 adds more features to the second stage model 150 (e.g., a machine learning model). Three candidate modifications are successively applied to the content evaluation pipeline 100B. For each candidate modification, a compute time value and a content selection value 350 of a modified content evaluation pipeline are calculated and plotted to generate a pipeline complexity curve 360 that is a plot of content selection values 365 versus compute time 370. An initial point 375 indicates an initial compute time value and an initial content selection value before modifications. A modification A 380 indicates a compute time value and a content selection value associated with the candidate modification A 310. A modification B 385 indicates a compute time value and a content selection value associated with the candidate modification B 320. A modification C 390 indicates a compute time value and a content selection value associated with the candidate modification C 330. Compared with the initial point 375, the modification A 380 and the modification C 390 indicate that the candidate modification A 310 and the candidate modification C 330 increase the complexity of the content evaluation pipeline 100B, while the modification B 385 indicates that the candidate modification B 320 reduces the complexity of the content evaluation pipeline 100B. The candidate modification A 310 increases more complexity than the candidate modification C 330. The pipeline complexity curve 360 also indicates that the candidate modification C 330 has a larger marginal content selection value relative to marginal compute time than the candidate modification A 310. The larger marginal content selection value relative to marginal compute time is, the faster the complexity of the content evaluation pipeline changes. In other words, for a given amount of compute time, the candidate modification C 330 is able to increase more complexity than the candidate modification A 310. Due to quantitative measurements (e.g., the pipeline complexity curve 360) of the complexity of the content evaluation pipeline 100B for each modification, the online system 240 (e.g., the pipeline optimization module 275) is able to optimize the content evaluation pipeline 100B to increase the content selection value for a given amount of compute time, and/or for different types of users, content and interactions.

FIG. 4 is a flowchart illustrating a process 400 for optimizing a content evaluation pipeline, in accordance with an embodiment. The process 400 may be performed by the online system 240. The process 400 may include different or additional steps than those described in conjunction with FIG. 4 in some embodiments or perform steps in different orders than the order described in conjunction with FIG. 4.

The online system 240 identifies 410 a content evaluation pipeline comprising an order of a plurality of stages having one or more computer models for evaluating a likelihood of user interaction with a content item, and the content evaluation pipeline selects a decreasing number of content items, from each stage of the order, according to the order of the stages in the order. Examples of a content evaluation pipeline are described above in FIGS. 1A and 1B.

The online system 240 identifies 420 a set of candidate modifications to modify one or more operational parameters of the content evaluation pipeline. Examples of operational parameters include the number of stages of a content evaluation pipeline, the number of computer models included in a stage, the number of layers of a computer model, the number of features of a computer model, the number of nodes of a computer model, and a type of a computer model. Examples of a candidate modification are described above in FIG. 3.

For each candidate modification, the online system 240 determines 430 a compute time value and a content selection value. Examples are described above in FIG. 3.

For a given amount of compute time, the online system 240 optimizes 440 the one or more operational parameters based in part on the determined compute time value and the content selection value to increase the content selection value of the content evaluation pipeline. In various embodiments, the online system 240 optimizes one or more content evaluation pipelines based on various types of users, content, and interactions. Examples are described above in FIGS. 2 and 3.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method performed by an online system, the method comprising:
identifying a content evaluation pipeline comprising an order of a plurality of stages having one or more computer models for evaluating a likelihood of user interaction with a content item and the content evaluation pipeline selecting a decreasing number of content items, from each stage of the order, according to the order of the stages in the order;
identifying a set of candidate modifications to modify one or more operational parameters of the content evaluation pipeline, the operational parameters comprising: a number of the plurality of stages in the content evaluation pipeline or a number of models in at least one stage of the plurality of stages;
for each candidate modification, determining a compute time value and a content selection value; and
for a given amount of compute time, optimizing the one or more operational parameters based in part on the determined compute time values and the content selection values of the candidate modifications to increase a content selection value of the content evaluation pipeline.

2. The computer-implemented method of claim 1, wherein the set of computer models comprise a plurality of machine learning models, and a plurality of deep learning models.

3. The computer-implemented method of claim 1, wherein the operational parameters further comprise: a number of layers of a computer model, a number of features of a computer model, a number of nodes of a computer model, or a type of a computer model.

4. The computer-implemented method of claim 1, wherein optimizing the one or more operational parameters comprises:
selecting a first candidate modification of the set to reduce a complexity of a first computer model that evaluates a less-valuable objective;
selecting a second candidate modification of the set to increase a complexity of a second computer model that evaluates a more-valuable objective; and
applying the first candidate modification and the second candidate modification to the content evaluation pipeline.

5. The computer-implemented method of claim 1, wherein optimizing the one or more operational parameters is further based in part on various selection characteristics, wherein increasing a complexity of the content evaluation pipeline for some selection characteristics that are likely to provide high content selection values, and reducing the complexity of the content evaluation pipeline for other selection characteristics that are likely to provide low content selection values.

6. The computer-implemented method of claim 1, wherein optimizing the one or more operational parameters is further based in part on marginal content selection values relative to marginal compute time, wherein a large marginal content selection value relative to marginal compute time changes a complexity of the content evaluation pipeline more than a small marginal content selection value relative to marginal compute time.

7. The computer-implemented method of claim 6, further comprising determine the marginal content selection value relative to marginal compute time, the determining comprises:
determining a difference of content selection values between an initial content evaluation pipeline and the content evaluation pipeline modified by a candidate modification, as the marginal content selection value;
determining a difference of compute time values between the initial content evaluation pipeline and the content evaluation pipeline modified by the candidate modification, as the marginal compute time value; and
dividing the marginal content selection value by the marginal compute time value.

8. The computer-implemented method of claim 1, wherein determining the content selection value comprises:
determining a prediction likelihood indicating that how likely a user will interact with the content; and
multiplying a bid amount with the determined prediction likelihood.

9. A non-transitory computer-readable medium comprising computer program instructions that when executed by a computer processor of an online system causes the processor to perform steps comprising:
identifying a content evaluation pipeline comprising an order of a plurality of stages having one or more computer models for evaluating a likelihood of user interaction with a content item and the content evaluation pipeline selecting a decreasing number of content items, from each stage of the order, according to the order of the stages in the order;
identifying a set of candidate modifications to modify one or more operational parameters of the content evaluation pipeline, the operational parameters comprising: a number of the plurality of stages in the content evaluation pipeline or a number of models in at least one stage of the plurality of stages;
for each candidate modification, determining a compute time value and a content selection value; and
for a given amount of compute time, optimizing the one or more operational parameters based in part on the determined compute time values and the content selection values of the candidate modifications to increase a content selection value of the content evaluation pipeline.

10. The non-transitory computer-readable medium of claim 9, wherein the set of computer models comprise a plurality of machine learning models, and a plurality of deep learning models.

11. The non-transitory computer-readable medium of claim 9, wherein the operational parameters further comprise: a number of layers of a computer model, a number of features of a computer model, a number of nodes of a computer model, or a type of a computer model.

12. The non-transitory computer-readable medium of claim 9, wherein optimizing the one or more operational parameters comprises:
selecting a first candidate modification of the set to reduce a complexity of a first computer model that evaluates a less-valuable objective;

selecting a second candidate modification of the set to increase a complexity of a second computer model that evaluates a more-valuable objective; and applying the first candidate modification and the second candidate modification to the content evaluation pipeline.

13. The non-transitory computer-readable medium of claim 9, wherein optimizing the one or more operational parameters is further based in part on various selection characteristics, wherein increasing a complexity of the content evaluation pipeline for some selection characteristics that are likely to provide high content selection values, and reducing the complexity of the content evaluation pipeline for other selection characteristics that are likely to provide low content selection values.

14. The non-transitory computer-readable medium of claim 9, wherein optimizing the one or more operational parameters is further based in part on marginal content selection values relative to marginal compute time, wherein a large marginal content selection value relative to marginal compute time changes a complexity of the content evaluation pipeline more than a small marginal content selection value relative to marginal compute time.

15. The non-transitory computer-readable medium of claim 14, further comprising determine the marginal content selection value relative to marginal compute time, the determining comprises:
   determining a difference of content selection values between an initial content evaluation pipeline and the content evaluation pipeline modified by a candidate modification, as the marginal content selection value;
   determining a difference of compute time values between the initial content evaluation pipeline and the content evaluation pipeline modified by the candidate modification, as the marginal compute time value; and
   dividing the marginal content selection value by the marginal compute time value.

16. The non-transitory computer-readable medium of claim 9, wherein determining the content selection value comprises:
   determining a prediction likelihood indicating that how likely a user will interact with the content; and
   multiplying a bid amount with the determined prediction likelihood.

17. A system comprising:
   a processor; and
   a non-transitory computer-readable medium comprising computer program instructions that when executed by the processor of an online system causes the processor to perform steps comprising:
      identifying a content evaluation pipeline comprising an order of a plurality of stages having one or more computer models for evaluating a likelihood of user interaction with a content item and the content evaluation pipeline selecting a decreasing number of content items, from each stage of the order, according to the order of the stages in the order;
      identifying a set of candidate modifications to modify one or more operational parameters of the content evaluation pipeline, the operational parameters comprising: a number of the plurality of stages in the content evaluation pipeline or a number of models in at least one stage of the plurality of stages;
      for each candidate modification, determining a compute time value and a content selection value; and
      for a given amount of compute time, optimizing the one or more operational parameters based in part on the determined compute time values and content selection values of the candidate modifications to increase a content selection value of the content evaluation pipeline.

18. The system of claim 17, wherein the set of computer models comprise a plurality of machine learning models, and a plurality of deep learning models.

19. The system of claim 17, wherein the operational parameters further comprise: a number of layers of a computer model, a number of features of a computer model, a number of nodes of a computer model, or a type of a computer model.

20. The system of claim 17, wherein optimizing the one or more operational parameters comprises:
   selecting a first candidate modification of the set to reduce a complexity of a first computer model that evaluates a less-valuable objective;
   selecting a second candidate modification of the set to increase a complexity of a second computer model that evaluates a more-valuable objective; and
   applying the first candidate modification and the second candidate modification to the content evaluation pipeline.

* * * * *